United States Patent
Fujita et al.

(10) Patent No.: US 6,924,916 B2
(45) Date of Patent: Aug. 2, 2005

(54) METHOD AND DEVICE FOR STABILIZING OPERATION POINT AND OPTICAL OUTPUT OF EXTERNAL OPTICAL MODULATOR

(75) Inventors: Takahisa Fujita, Tokyo (JP); Toshio Sakane, Tokyo (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 0 days.

(21) Appl. No.: 10/636,172

(22) Filed: Aug. 7, 2003

(65) Prior Publication Data

US 2004/0190103 A1 Sep. 30, 2004

(30) Foreign Application Priority Data

Aug. 9, 2002 (JP) ........................................ 2002-233439

(51) Int. Cl.[7] .............................. G02F 1/01; G02F 1/07
(52) U.S. Cl. ........................................ 359/239; 359/237
(58) Field of Search ................................ 359/237, 239; 398/183, 186

(56) References Cited

U.S. PATENT DOCUMENTS

| | | | | |
|---|---|---|---|---|
| 5,170,274 A | | 12/1992 | Kuwata et al. ............. 398/198 |
| 5,359,449 A | | 10/1994 | Nishimoto et al. .......... 398/198 |
| 5,917,637 A | * | 6/1999 | Ishikawa et al. ............ 398/197 |
| 6,317,247 B1 | * | 11/2001 | Yang et al. .................. 359/245 |
| 6,317,249 B1 | | 11/2001 | Nakamoto et al. ........... 359/279 |
| 6,334,004 B1 | | 12/2001 | Ohkuma et al. ................ 385/2 |
| 6,362,913 B2 | | 3/2002 | Ooi et al. .................... 359/245 |
| 6,570,698 B2 | * | 5/2003 | Kim et al. ................... 359/239 |
| 2002/0018283 A1 | | 2/2002 | Hayashi et al. ............. 359/279 |

FOREIGN PATENT DOCUMENTS

EP    1 030 469 A2    8/2000    ......... H04B/10/155

* cited by examiner

*Primary Examiner*—Georgia Epps
*Assistant Examiner*—M. Hasan
(74) *Attorney, Agent, or Firm*—Chapman and Cutler LLP (57) ABSTRACT

A method and device for stabilizing operation point and optical output of an external optical modulator. A low-frequency signal below a lower limit of signal frequency band of an input signal inputted to optical modulator is superimposed onto direct current bias. A low-frequency component included in detector output is extracted. On the basis of the low-frequency signal, output of the low-frequency component is normalized, and output-light of light source is controlled in accordance with normalized low-frequency component. Means of controlling optical output of light source, in control of output-light of light source, detects the output-light, compares the value of detected output-light to a standard value of primary optical output, and adjusts the output-light. The standard value is modified according to a ratio of primary value of normalized low-frequency component to a subsequent value, and means controlling optical output of light source is operated on the basis of modified standard value.

18 Claims, 9 Drawing Sheets

METHOD AND DEVICE FOR STABILIZING OPERATION POINT AND OPTICAL OUTPUT OF EXTERNAL OPTICAL MODULATOR

BACKGROUND OF THE INVENTION (1) Field of the Invention

The present invention relates to the method and device for stabilizing operation point and optical output of external optical modulator, which is used for an optical communication system. More particularly, the invention relates to the method and device for stabilizing the operation point and optical output of external optical modulator, which provides a means of regulating direct current bias automatically that determines the operation point of the modulation curve of external optical modulator.

(2) Related art statement

Corresponding to the increasing demand for recent high-speed and high-capacity information communication, optical communication has been attracting attention. In optical communication system, the method is taken, which converts the information of electrical signal array, which is to be transmitted, into a light signal array, sends it over a long distance mainly by optical fiber and then restores the transmitted light signal array to electrical signal array in long distant place.

Optical modulator is used as the means of converting the electrical signal array into the light signal array. In detail, various optical modulators are utilized depending on the speed of signal array used, the transmission distance and the light wavelength. For example, direct modulations of laser diode (LD), electric field absorption form (EA) modulators or external optical modulators, which modulate the light from CW (Continuous Wave) laser by using the optical modulator (LN optical modulator) with optical guide like Mach-Zehnder (MZ) type on the surface of the base plate that is made of materials with electro-optic effect, such as lithium niobate (LN), have been used.

Among other things, LN optical modulator is known widely as light control element which is suitable for the optical communication in broadband frequency as it can work at extremely high speeds, it doesn't have any light wavelength dependency and furthermore, it is easy to be controlled the chirp amount. Particularly it is used as the optical modulator that is suitable to the dense wavelength division multiplexing (DWDM) and high-speed communication.

However, for the LN optical modulator, there is a phenomenon (DC drift phenomenon) that the modulation curve of optical modulator moves along an applied voltage axis, depending on the variation in temperature of environment, or on the applied direct current (DC) voltage that sets the operation point (it is the voltage that is the standard for modulation signal, and usually, the signal voltage for modulation, the center of which is the voltage set as an operation point, is applied) of LN optical modulator's modulation curve (it is the curve that shows the optical output variation from optical modulator in response to the applied voltage to optical modulator).

Therefore, a method for stabilizing the operation point of optical modulator and constantly controlling the amount of output-light has been used.

One of the methods for stabilizing the operation point of optical modulator, for example, is to superimpose a low-frequency signal onto signal array and impress it to the optical modulator, extract the said superimposed low-frequency component from the optical output of the optical modulator, detect the gap of operation point by comparing the phase difference between the low-frequency signal before superimposed and the low-frequency component extracted from the said optical output and give feedback control to the value of DC voltage applied to the optical modulator so that the amount of the said gap may be reduced to zero.

Another example of the method is to monitor the amount of output-light from optical modulator and then control the applied DC voltage so that the amount of the said output-light may become constant. Moreover, based on the above-mentioned methods, various types of supplemental method and technique have been proposed, such as how to detect the amount of the operation point gap with a high degree of accuracy.

Figure 9:
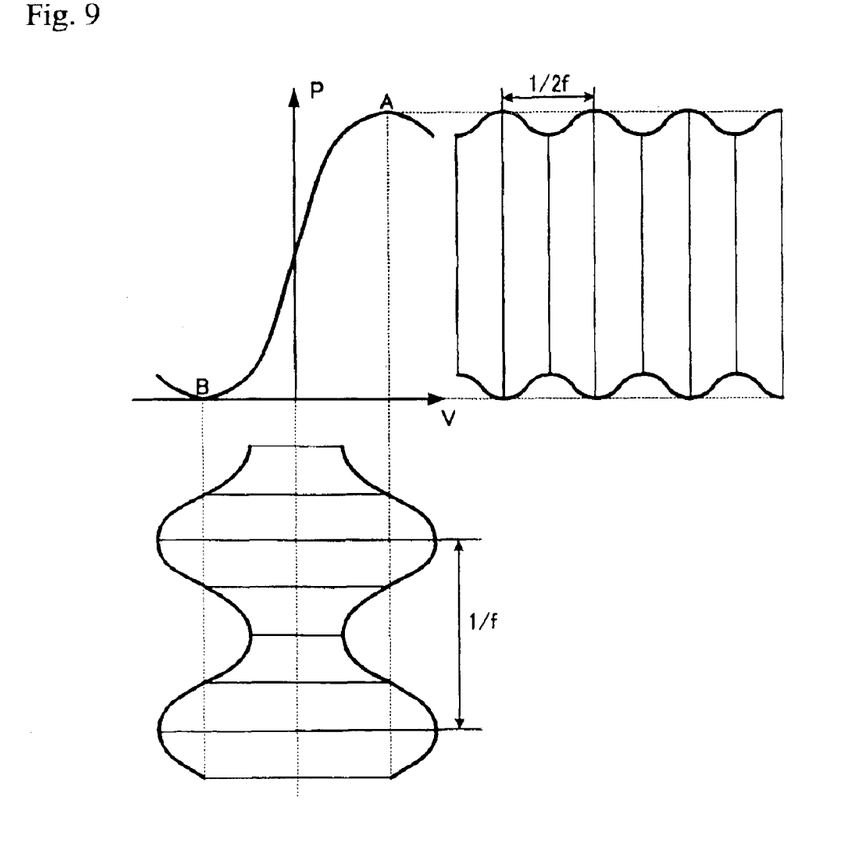
FIG. 9 shows the relationship of the modulation signal, the operation point of which is the top or the bottom of modulation curve of optical modulator, and optical output.

FIG. 9 is one of the examples of the conventional practice, in which the low-frequency of frequency f is superimposed in opposite phase onto applied voltage V at top A and bottom B of the modulation curve of optical modulator. Optical output P at the ideal operation point (point A, B) has only low-frequency component of frequency $2f$, as indicated in the figure, and the superimposed frequency f component has disappeared. Thus, in order to minimize the frequency f component that is contained in optical output, the DC component applied to optical modulator is controlled.

In the above-mentioned method, since a low-frequency is added in at top A and bottom B where a modulation is saturated, it is necessary to increase the amplitude of the applied low-frequency voltage in order to detect the optical output variation from optical modulator easily. Therefore, the problem of deformation of wave pattern of the electrical signal array, which are the original data, has been brought about.

Figure 10:
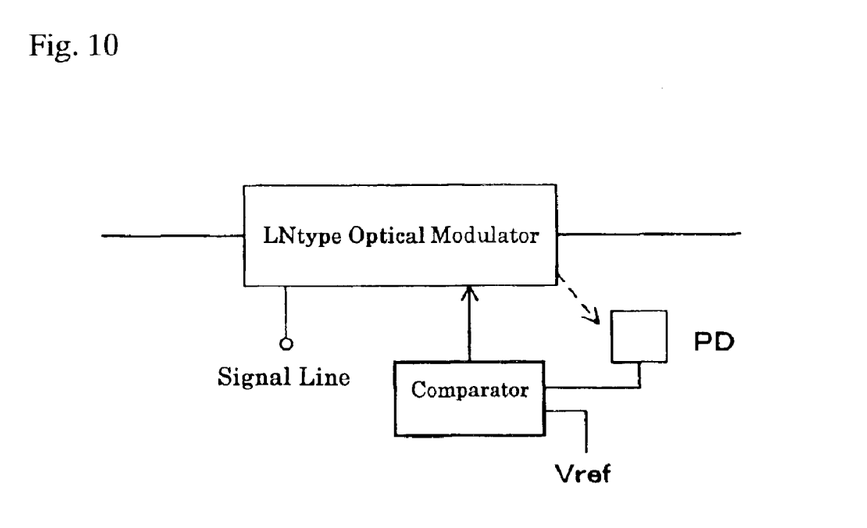
FIG. 10 shows the conventional method of stabilizing optical output.

Also, as indicated in FIG. 10, the radiation light from LN type optical modulator, as an external optical modulator, is detected by using the photodiode (PD), which is the optical detector that is located adjacent to the LN type optical modulator, and the detection signal corresponding to the optical output from the optical modulator is outputted. Alternatively, it is possible to diverge some of the output-light from the LN optical modulator, detect it directly and obtain the detection signal corresponding to the optical output from the optical modulator.

The detection signal outputted by the photodiode is compared to standard value Vref, which is set up separately, and then the DC voltage applied to the LN type optical modulator is controlled so that the both may correspond to each other. In the conventional practice as mentioned above, in case there is the optical output variation of the light source itself or the transmission factor variation in LN optical modulator, there occurs a gap between the standard value and the optical detection output at the ideal operation point in the modulation curve of optical modulator (hereinafter referred to as "ideal operation point"; although it is often the case that it means the node or the inflection point of modulation curve in particular, it herein means not only the above-mentioned, but also the center point of the variation of modulation signal, which is intended by the designer.). As a result, the adjusted operation point deviates from the ideal operation point.

The purpose of present invention is to solve the above-described problems, to control the wave pattern deformation of electrical signal array, and to provide the method and device for stabilizing the operation point and optical output of external optical modulator, which can set up the operation point of the modulation curve of optical modulator or the optical output from optical modulator stably even in case there is the optical output variation of the light source itself or the transmission factor variation in the optical modulator.

SUMMARY OF THE INVENTION

In order to achieve the above-described objects, the invention related to claim 1 has following features. The method for stabilizing operation point and optical output of external optical modulator includes light source, external optical modulator modulating the light from the light source, optical detector detecting the output-light from the said external optical modulator, and the means of regulating direct current bias applied to the said external optical modulator, which regulates the direct current bias determining the operation point of modulation curve of the said external optical modulator, according to the output of the said optical detector, wherein low-frequency signal, which is frequency below the lower limit of the signal frequency band of input signal inputted to the said external optical modulator, is superimposed onto the said direct current bias, and the low-frequency component included in the output of the said optical detector is extracted, and the output of the said low-frequency component is normalized on the basis of the said low-frequency signal, and the output-light of light source is controlled in accordance with the said normalized low-frequency component.

In accordance with the invention related to claim 1, as the frequency of the low-frequency inputted to external optical modulator is below the lower limit of the signal frequency band of input signal, the wave pattern deformation of electrical signal array does not occur. Moreover, it is made possible to normalize the output of detected low-frequency component on the basis of the low-frequency signal applied to external optical modulator, and to judge the state change caused from the optical output variation of the light source itself and the transmission factor variation in optical modulator, by the variation of the said normalized low-frequency component, and then, it is also made possible to achieve the stabilizing control of the proper operation point at any time, such as necessary controlling the output-light from the light source according to the result of the above judgment.

In addition, the invention related to claim 2 has following features.
The method for stabilizing operation point and optical output of external optical modulator, as claimed in claim 1, is characterized in that the means of controlling optical output of light source is equipped, which, in control of the output-light of the said light source, detects the output-light from the said light source, compares the value of said detection to the standard value of primary optical output determining primary optical output, and adjusts the output-light of the said light source, and the said standard value of primary optical output is modified according to the ratio of the primary value of the said normalized low-frequency component to the subsequent value, and the said means of controlling optical output of light source is operated on the basis of the said modified standard value.

In accordance with the invention related to claim 2, when it is considered as the state change caused from the optical output variation of the light source itself or the transmission factor variation in optical modulator, as method of adjusting the output-light of light source adequately, in case it is possible to detect the output-light of light source, and control the output-light of light source with comparing the said detected value to the primary optical output standard value, the present invention only requires changing the standard value of primary optical output in the means of controlling optical output of light source, in other words, the easy-to-use correction circuit of standard value is only added to the existing means of controlling optical output of light source. This makes possible to achieve stabilization of the operation point of optical modulator and also, stabilizing control of the optical output of optical modulator easily.

In addition, the invention related to claim 3 has following feature. The method for stabilizing operation point and optical output of external optical modulator, as claimed in claim 1, is characterized in that, in control of the output-light of the said light source, the output-light of light source is controlled in order that the primary value of the said normalized low-frequency component may accord with the subsequent value.

In accordance with the invention related to claim 3, when it is considered as the state change caused from the optical output variation of the light source itself or the transmission factor variation in optical modulator, as other method of adjusting the output-light of light source adequately, in case it is not possible to detect the output-light of light source, based on the variation of the said normalized low-frequency component, which corresponds to the state change caused from the optical output variation of the light source itself or the transmission factor variation in optical modulator, it is made possible, only by controlling the output-light of light source so that the said variation may be reduced to zero, to achieve stabilization of the operation point of optical modulator and also, stabilizing control of the optical output of optical modulator easily.

In addition, the invention related to claim 4 has following feature. The device for stabilizing operation point and optical output of external optical modulator, utilizes the method for stabilizing operation point and optical output of external optical modulator, as claimed in claim 1 to 3.

Like the invention related to claim 4, the device that utilizes the method for stabilizing the operation point and optical output of external optical modulator as claimed in claim 1 to 3 can provide the device for stabilizing the operation point and optical output of external optical modulator which materializes the outstanding performance that the above-described each method provides, such as controlling the operation point of optical modulator or the optical output from optical modulator adequately corresponding to the state change caused from the optical output variation of the light source itself or the transmission factor variation in optical modulator.

In addition, the invention related to claim 5 has following feature. The device for stabilizing operation point and optical output of external optical modulator, as claimed in claim 4, is characterized in that the said optical detector is photodiode that is incorporated into the module including external optical modulator.

In accordance with the invention related to claim 5, by adopting the photodiode as optical detector that detects the output-light from external optical modulator, which is essential to the present invention, it is made possible to install the said optical detector in optical modulator module compactly, and as a result, it is possible to enhance the convenience of the device for stabilizing the operation point and optical output of external optical modulator related to the present invention, and make it far superior product.

In addition, the invention related to claim 6 has following feature. The device for stabilizing operation point and optical output of external optical modulator, as claimed in claim 4 and 5, is characterized in that the said means of regulating direct current bias has averaging circuit for obtaining the mean value of output of the said external optical detector, and regulates the direct current bias applied to external optical modulator in accordance with the value of the said averaging circuit.

In accordance with the invention related to claim 6, as direct current bias applied to optical modulator is regulated in accordance with the mean value of optical output, it is possible to mitigate the influence of frequency variation of signal applied to optical modulator for direct current bias regulation, the frequency dependency of detection sensitivity of optical detector, and the noise in detecting, to detect the stable intensity of output-light constantly, and to regulate the direct current bias adequately. Moreover, it is also possible to materialize it easily by easy-to-use electronic circuit such as averaging circuit and to provide superior device for stabilizing the operation point and optical output of external optical modulator.

In addition, the invention related to claim 7 has following feature. The device for stabilizing operation point and optical output of external optical modulator, as claimed in claim 4 to 6, is characterized in that low-pass filter or band-pass filter is used in order to extract the low-frequency component included in the output of the said optical detector.

As the feature of the present invention, the stabilizing control of operation point and optical output of external optical modulator is done by applying the low-frequency signal that is frequency below the lower limit of the signal frequency band, to external optical modulator, and detecting the optical output variation of optical modulator related to the said low-frequency signal, and it is made possible, by using low-pass filter or band-pass filter as the invention related to claim 7, to detect only the low-frequency component effectively, which is focused on as the detection signal of optical detector.

Furthermore, as the synergistic effect of the inventions related to claim 6 and 7, it is made possible to generate necessary detection signal by using common optical detector, for the variation of direct current bias which affects the variation of operation point of external optical modulator and for the state change caused from the optical output variation of the light source itself or the transmission factor variation in optical modulator. And also it is made possible to achieve more suitable stabilizing control of the operation point and the optical output of optical modulator.

In addition, the invention related to claim 8 has following feature.
The device for stabilizing operation point and optical output of external optical modulator, as claimed in claim 4 to 7, is characterized in that the said means of regulating direct current bias has slope-selecting means which, in fixing the operation point of modulation curve of the said external optical modulator, enables the selection of slope of the said modulation curve.

In accordance with the invention related to claim 8, even in case of regulating the chirp amount of optical modulator for the purpose such as improvement of transmission loss in optical communication, by using slope-selecting means, it is possible to control the chirp variously, and further, to materialize the stabilization of operation point of optical modulator and optical output from optical modulator as appropriate according to each condition.

In addition, the invention related to claim 9 has following feature. The device for stabilizing operation point and optical output of external optical modulator, as claimed in claim 4 to 8, is characterized in that the said light source is laser diode.

In accordance with the invention related to claim 9, as the laser diode has the advantages that it makes it easy to control the optical output of light source and the element itself is compact, by using laser diode, it is possible to provide superior device for stabilizing the operation point and optical output of external optical modulator with functions such as increasing the reactivity of feedback control to light source, which is essential to the present invention, and setting up the whole device including light source compactly.

BRIEF DESCRIPTION OF THE DRAWINGS

FIG. 5 shows that (a) is the connection diagram of means for operation point comparison and (b) shows the convergence condition of operation point in positive slope.

FIG. 6 shows that (a) is the connection diagram of means for operation point comparison and (b) shows the convergence condition of operation point in negative slope.

FIG. 11 is the circuit diagram showing the controlling method of second embodiment of the present invention Explanations of Letters or Numerals 1 LN optical modulator module
2 LN chip
3 signal array input port
4 terminator
5 DC bias input port
14 photodiode
12 light source
15 TIA
19 circuit of setting standard value of primary operation point
21 averaging circuit
23 operation point standard value memory
24 comparison means
27 slope-setting circuit
47, 71 means of controlling output-light
49 frequency superimposing circuit
50 low-frequency signal source
51 filter
58 correction circuit of optical output standard value
59 optical output setting circuit
60, 76 LD drive circuit
63, 77 current limiter
64 optical output primary standard value circuit
75 memory

DETAILED DESCRIPTION OF THE INVENTION

The favorable examples of the present invention will be explained in detail hereinafter.

Figure 1:
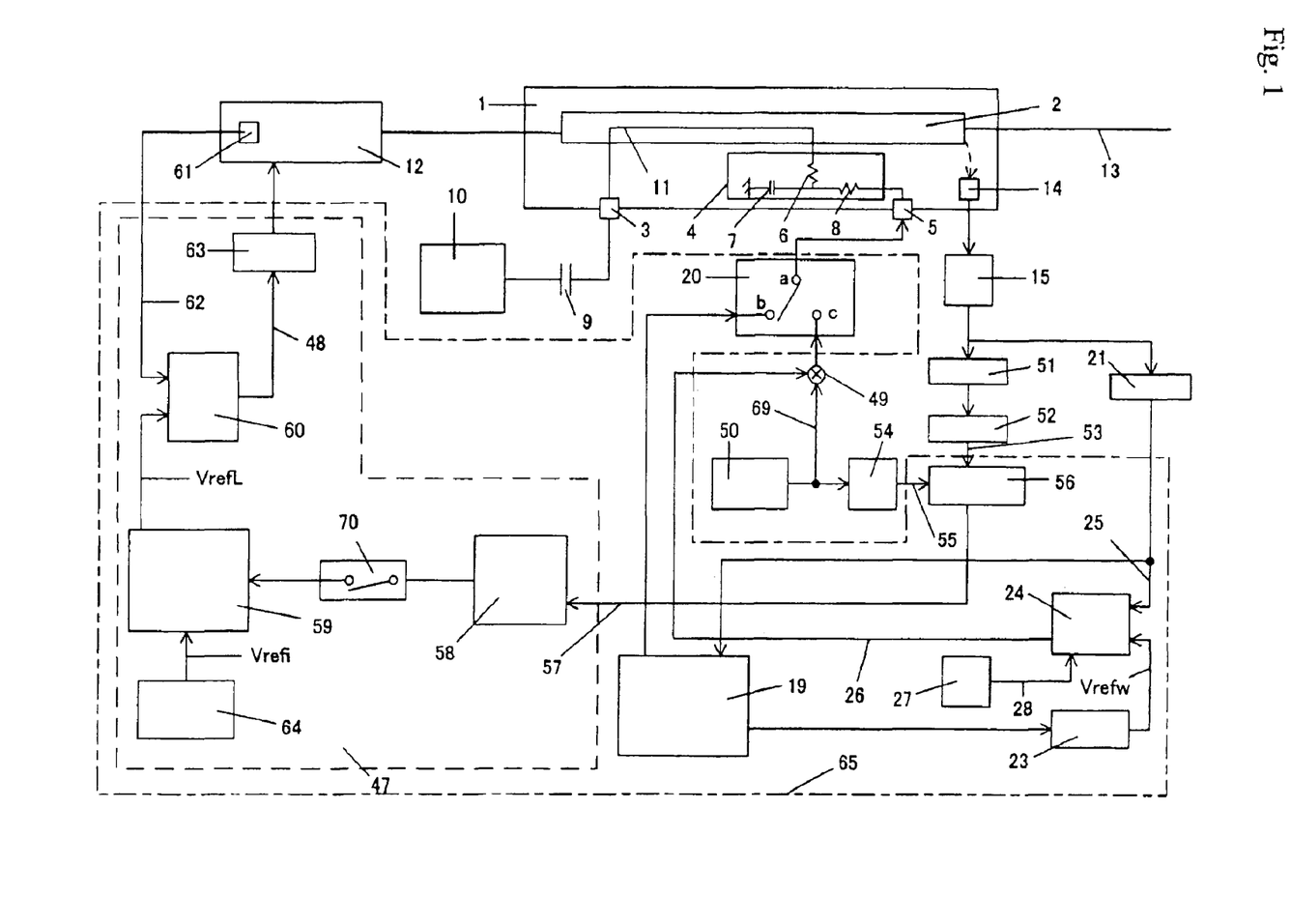
FIG. 1 is the circuit diagram showing the controlling method of first embodiment of the present invention.

FIG. 1 is the diagram for explaining the first embodiment of the present invention. 1 is LN optical modulator module, and 2 is LN chip.

As the base plate that composes optical modulator, it is preferable to use the material with electro-optical effect, such as lithium niobate (LiNbO$_3$; hereinafter referred to as LN), lithium tantalate (LiTaO$_3$), PLZT (lead lanthanum zirconate titanic acid) and quartz system, especially to use LiNbO$_3$ crystal, LiTaO$_3$ crystal, or solid solution crystal that is comprised of LiNbO$_3$ and LiTaO$_3$ on the grounds that they are easy to be composed as optical guide device and they have strong anisotropy. The present embodiment will be explained focusing on the example using lithium niobate (LN).

The method of producing optical modulator is to form optical guide on LN base plate by the thermal diffusion of Ti, and then form electrodes directly on the LN base plate without forming a buffer layer on the part of or on the entire base plate. Another method is to form the above-described electrode indirectly by forming a buffer layer such as dielectric SiO$_2$ on the LN base plate in order to decrease the propagation loss of light in optical guide, and forming the electrode patterns of Ti or Au and then composing modulation electrodes and ground electrodes with a height of several tens μm by gilding method on the layer.

In general, optical modulators (LN chip 2 in FIG. 1) are produced by building several optical modulators into one piece of LN wafer and separating it into each chip of the optical modulator in the last place.

Although it is possible to select various configurations of optical guide, which is formed on the surface of LN chip 2, the present embodiment uses Mach-Zehnder (MZ) type optical guide.

The configuration of MZ type optical guide is set up by separating an input optical guide into two optical guides with Y type branch optical guide, and then, merging two optical guides with the other Y type branch optical guide and connecting it to an output optical guide.

The light inputted into LN chip moves along this MZ type optical guide, and especially in two optical guides, modulation electrodes and ground electrodes are arranged adjacent to the said optical guide, and the light propagated in optical guide is phase-modulated according to the signal applied to the modulation electrodes. After the phase modulation, each guided wave merges together in the other branch optical guide, interferes mutually and generates intensely modulated signal light.

The signal light is propagated in the output optical guide and outputted from optical modulator module 1 through output fiber 13.

FIG. 1 shows simply the condition that modulation electrode 11, which applies modulation signal to LN chip 2, is introduced.

Modulation electrode 11 is generally traveling-wave electrode and the signal array of microwave, which is applied to port 3, is propagated in the same direction as light in waveguide. On the other hand, the other end of modulation electrode 11 is terminated at terminator 4 and the terminator is connected to port 5 to which direct current (DC) bias voltage is applied, through resistance.

Modulation electrode can be integrated with DC electrode as in FIG. 1, and independently separated from DC electrode although this is not shown in the figure.

Terminator 4 is mainly comprised of terminator resistance 6, condenser 7, and resistance 8 for applying DC, and the signal array from signal generator 10 is applied to modulation electrode 11 through condenser 9 and terminated by resistance 6 after being propagated in modulation electrode 11.

The high-frequency impedance in module from port 3 is the resistance value that is represented as terminator resistance 6 and the side of DC bias port thorough resistance 8 can be ignored.

In addition, the DC resistance from DC bias port 5 becomes infinite by condenser 7 and 9.

The light emitted from laser diode (LD) 12, which is a light source, is inputted to the optical guide of LN chip 2, is modulated in LN chip as described above, and then, is outputted thorough fiber 13 from the other end of LN chip.

Also, a part of output-light is monitored by photodiode (PD) 14 that is an optical detector incorporated into optical modulator module 1.

The output current of the said PD 14 is converted into voltage by transformer impedance amplifier (TIA) 15. As exemplified in FIG. 2, the photocurrent $i_p$ which is proportional to the optical input to PD, flows from PD 14 that was reversely biased, and is converted into voltage value corresponding to the said photocurrent by resistance 16 (resistance value R), and then outputted from buffer amplifier 17. Input current $i_p$ and output voltage $V_O$ of TIA 15 are in the linear relation of $V_O = i_p \times R$ and hereinafter the said output of TIA 15 is explained as the output of PDF 14 for convenience.

Figure 2:
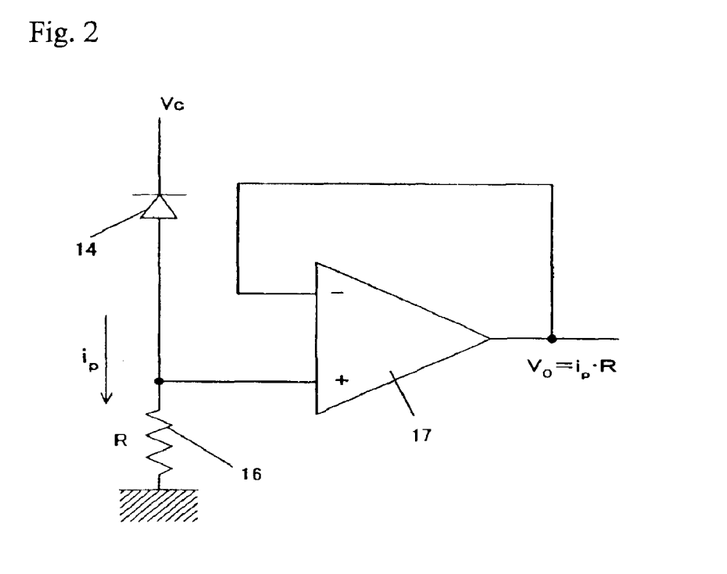
FIG. 2 is the circuit diagram showing transformer impedance amplifier.

As monitoring the output-light by the said incorporated PD 14 is a well-known technique, it is not covered in detail here. In addition, PD 14 is explained hereinafter, for convenience, as the output phase of PD 14 that is in phase with the output-light. Although, in the monitoring method of detecting the radiation light from LN chip, the radiation phase becomes in opposite phase with PD output, it is possible, by amendment through the known phase reversal circuit or outputting the signal in inverse proportion to the said photocurrent, to obtain the signal that is in phase with the radiation easily. Furthermore, as it is possible to obtain the detection signal that is in phase with the output-light by detecting the part of the output-light directly, PD output phase is explained as in phase with the output-light in the following.

The signal array from signal generator 10 is inputted to port 3 through DC cut condenser 9. Therefore the signal array inputted to modulation electrode becomes radio-frequency (RF) signal centered on the DC voltage applied to DC bias port 5.

Figure 3:
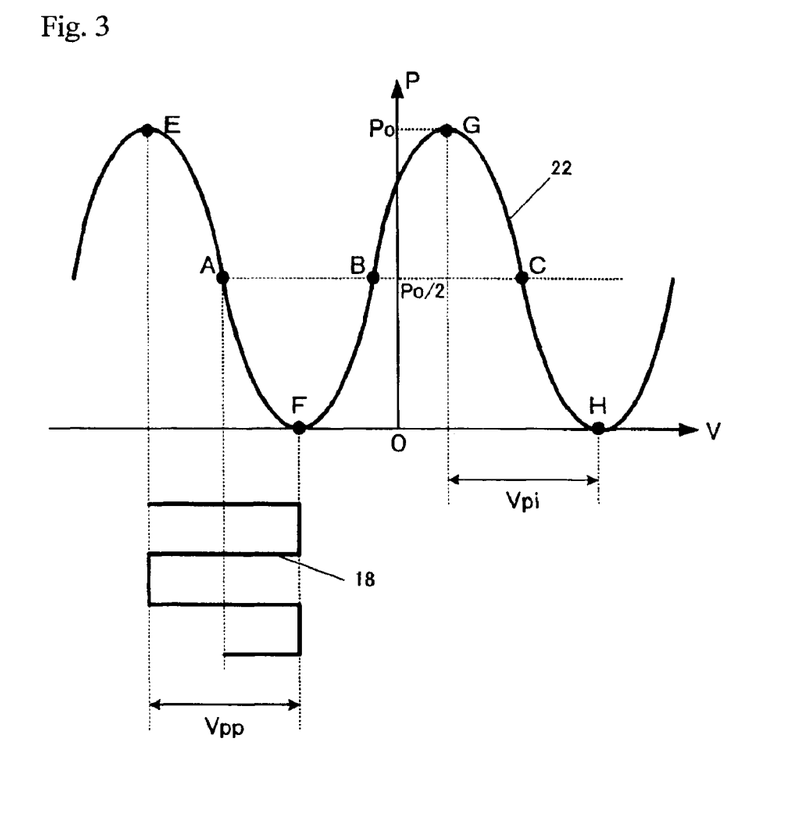
FIG. 3 shows the modulation curve of optical modulator.

As described in FIG. 3, optical output P is varied in accordance with applied voltage V, along modulation curve 22 in a LN modulator.

In order to obtain the maximum optical amplitude and maximum extinction ratio against applied signal array 18, the operation point of modulation signal is set at point A, point B or point C, which is P$_O$/2 against maximum output P$_O$. At the same time amplitude Vpp of signal array 18 is set at voltage Vpi that is located between the neighboring top point and bottom point. The said Vpi has the same value between point E and F, point F and G, and Point G and H.

In the primary stage of operation (power on or restarting an operation from operation reset), the initial setup of DC bias that is supposed to be the operation point of modulation signal is made. The means of setting primary standard value 19 inputs the variable DC voltage to DC bias port 5 through switch (SW) 20, and incorporated PD 14 detects the optical output from optical modulator, which is varied according to the variable DC voltage. The output of PD 14 is made averaged by averaging circuit 21 in order to observe the effect of the variable DC voltage superimposed onto RF signal.

As for SW 20, the contact points a and b have conduction at the initial operation and the contact points a and c have conduction instead after the said initial operation.

The specific relationship of the variable DC voltage and the optical output in optical modulator is obtained as the modulation curve of curve 22 in FIG. 3 and the top output $P_O$ of the said curve is obtained. The output voltage of averaging circuit 21, which is ½ of the said $P_O$, is memorized as operation point standard voltage Vrefw in standard value memory 23.

The operation point comparison means 24 outputs DC bias voltage 26 so that in comparing signal 25 of averaging circuit 21 as the detection signal corresponding to an optical output, with Vrefw, the gap between them may be reduced to zero.

Slope-setting means 27 is a switch; for example, in the positive slope of modulation curve, the polarity of output 28 becomes GND, and in the negative slope, it becomes source voltage (VC).

Figure 4:
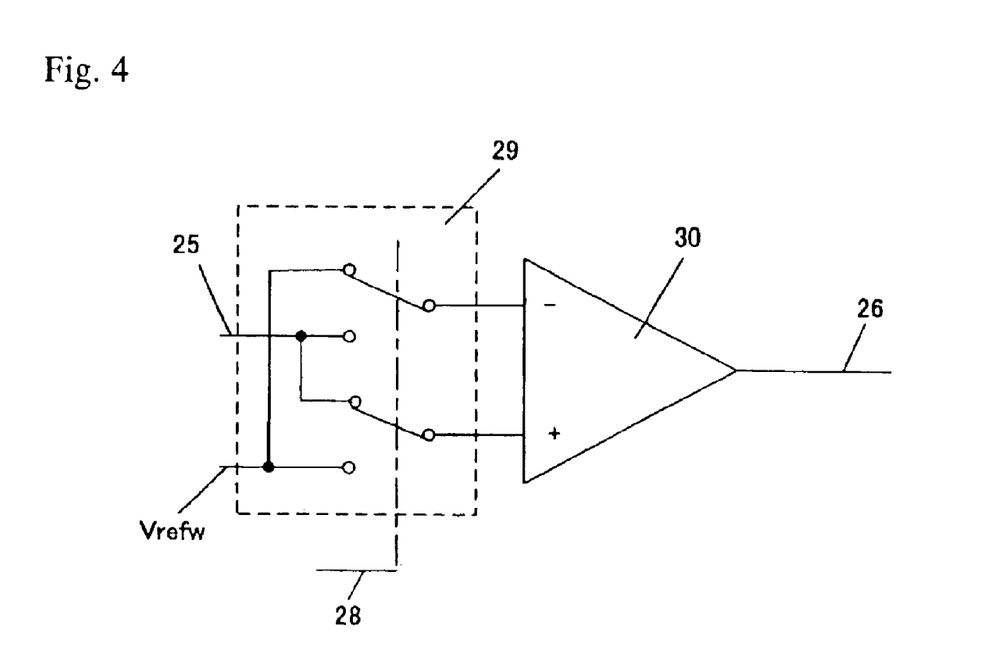
FIG. 4 is the circuit diagram composing the means for operation point comparison.

Operation point comparison means 24 is, as described in FIG. 4, comprised by operational amplifier 30 and switch (SW) 29 that shifts the input polarity to the said operational amplifier, and it shifts SW 29 corresponding to the slope selected by slope-setting means 27.

Figure 5:
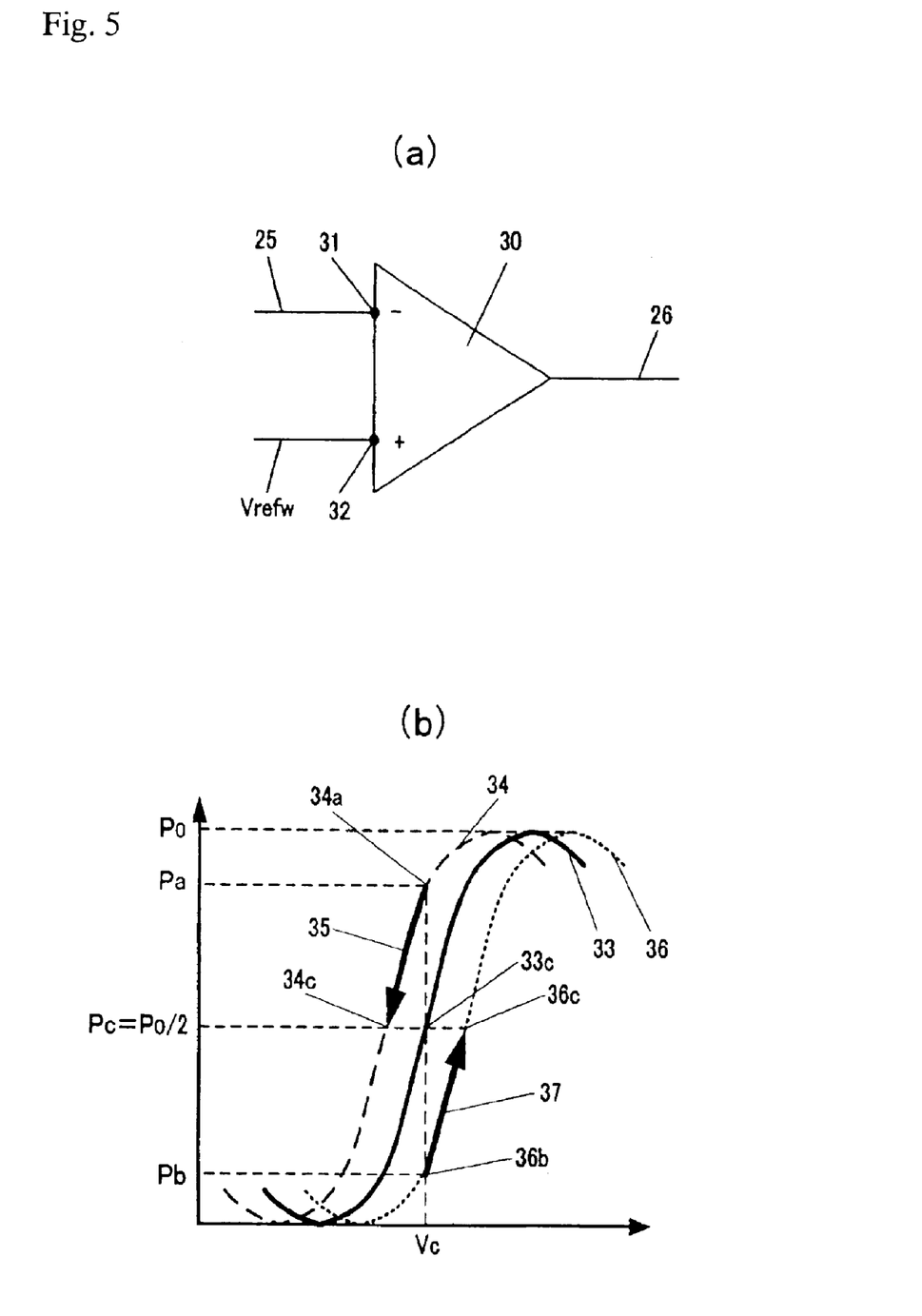

The polarity in a positive slope is described in FIG. 5(*a*), and the condition of control on the modulation curve is described in FIG. 5(*b*).

In this case, PD output is connected to "−" input terminal 31 of comparison circuit 30 that is an operational amplifier, and Vrefw is connected to "+" input terminal 32.

As explanation of the procedure of control in FIG. 5(*b*), curve 33 is a primary modulation curve. DC bias point is set at the point 33*c* where $P_O/2=PC$ and in this case, the DC bias voltage is Vc.

In case the modulation curve shifts to 34 due to the factors such as DC drift in optical modulator, the operation point moves from 33*c* to 34*a* and the optical output becomes Pa. Pa>Pc (In case the optical output is Pc, the PD output becomes equal to Vrefw.) and output 26 of comparison means 24 changes in the direction of decreasing DC bias voltage.

Due to this change of DC bias, the operation point moves from 34*a* in the direction of arrow 35 and converges on the point 34*c* where P=Pc in the end.

In addition, if the modulation curve shifts to 36 that is in the opposite direction, the operation point moves from 33*c* to 36*b* and the optical output becomes Pb (<Pc).

In this case, the output 26 of comparison means 24 changes in the direction of further increasing DC bias voltage and the operation point moves in the direction of arrow 37 and converges on the point 36*c* where P=Pc.

Figure 6:
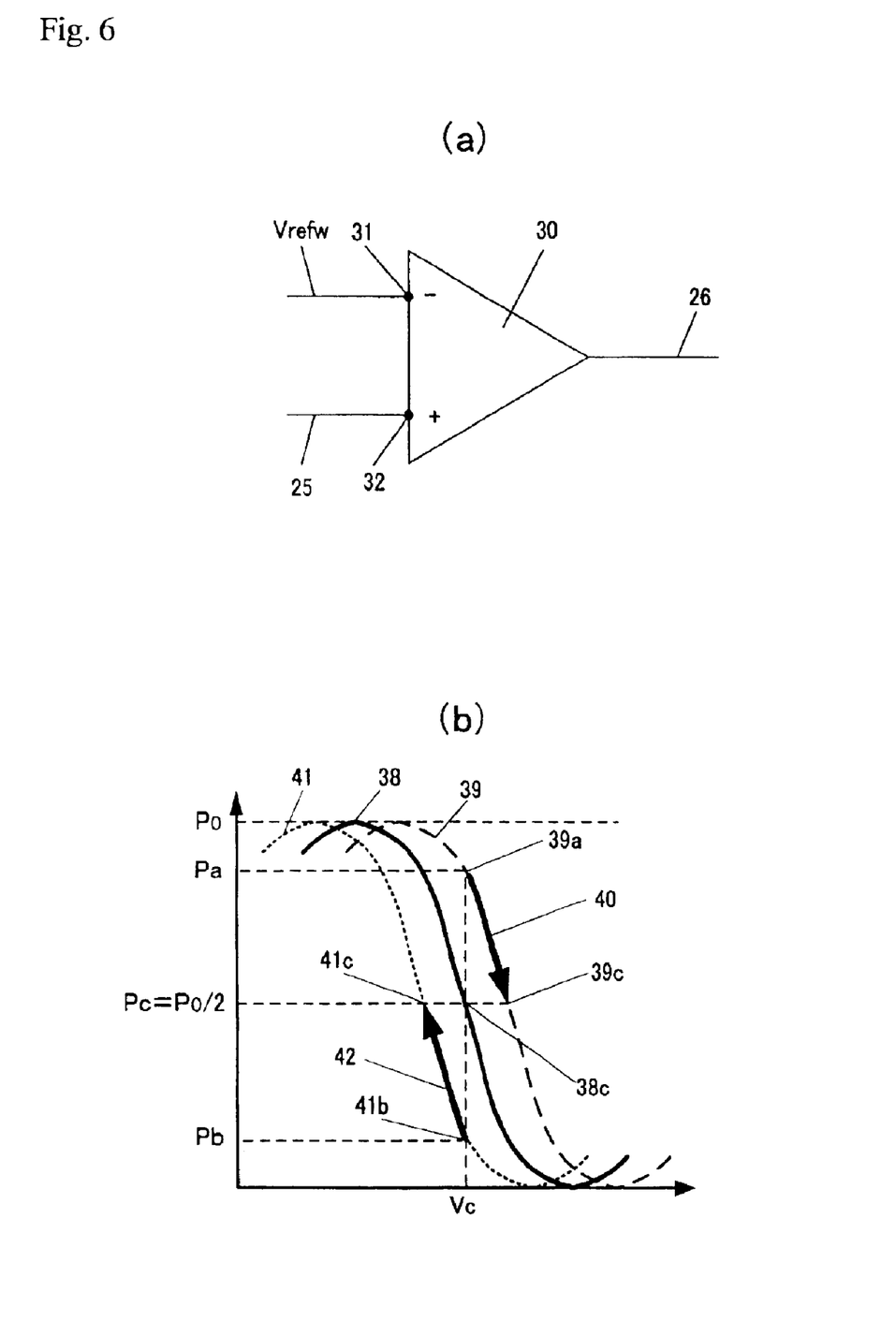

FIG. 6(*a*) shows the input connection of comparison circuit 30 when the negative slope is selected. Vrefw is connected to terminal 31, and PD output is connected to terminal 32. Therefore the direction of DC bias control against the shift of modulation curve is altered in the opposite direction to that of positive slope.

I.e. if modulation curve 38 shifts to curve 39, the primary operation point 38*c* moves to 39*a* and Pa>Pc. In the connecting relationship of comparison circuit 30 as in FIG. 6(*a*), the output 26 of comparison circuit changes DC bias in the direction of further increase and the operation point moves in the direction of arrow 40 and converges on the point 39*c*.

In addition, for curve 41, as the operation point moves to 41*b* and Pb<Pc, the output 26 of comparison circuit 30 changes DC bias in the direction of further decrease. Therefore, the operation point moves in the direction of arrow 42 and converges on the point 41*c*.

As described above, even in case the modulation curve shifts, it is possible to maintain the same operation point stably because the output 26 of operation point comparison means 24 is varied for PD output becoming $P_O/2$.

However, in the above method of stabilizing operation point, if the output (Pi) of light source 12 that is an optical input, or the optical transmission factor (T) of LN optical modulator are varied due to some sort of factor, the PD output is varied even if the operation point hasn't been changed, and as a result, it is judged, in the operation point comparison circuit, that the modulation curve has shifted and then, DC bias gets varied in order to modify the operation point, and then the operation point deviates from the most suited operation point (½ of maximum output).

Figure 7:
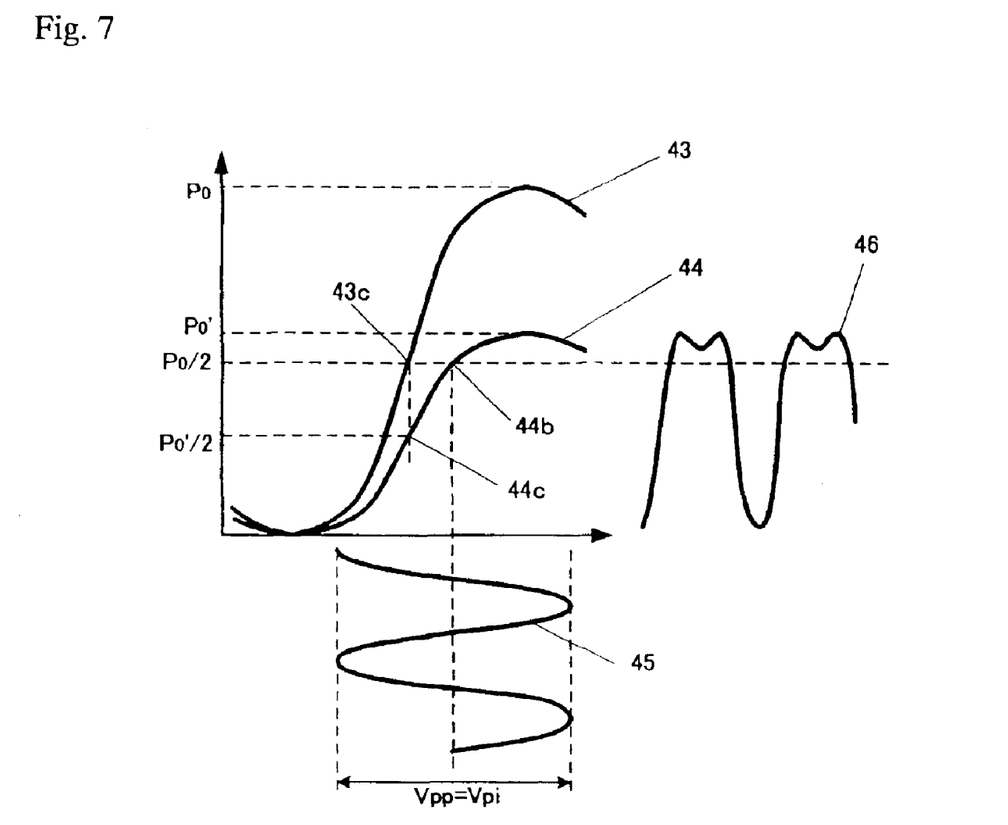
FIG. 7 shows the variation of modulation curve caused from optical output variation of light source or the optical transmission factor variation of optical modulator.

FIG. 7 explains the above-described condition with the case when the value of Pi×T diminishes as example. In primary modulation curve 43, the top output is $P_O$ and the operation point is 43*c* where the output is $P_O/2$.

If either the optical input Pi or the optical transmission factor T is reduced, the modulation curve is changed to the modulation curve 44 with the top output $P_O'$. In this case, in the operation point comparison circuit, the operation point moves to point 44*b* of curve 44 as control is made to keep the output as $P_O/2$. I.e. the operation point deviates significantly from the ideal operation point 44*c* where the output is $P_O'/2$.

In this case, because the signal array 45 with the amplitude equal to Vpi is inputted with the operation point 44*b*, the optical output has a deformed wave pattern at around the top like 46.

One of the main objects of the present invention is to maintain the optical output from LN optical modulator constant in order to avoid such inconvenience, by using optical output controlling means 47 for holding Pi×T constant.

Various methods are proposed as the optical output regulating method of laser diode (LD). In the following, the optical output of LD 12 is explained as its increasing in proportion to drive current 48.

The low-frequency superimposing circuit 49 superimposes the signal of frequency f from low-frequency signal source 50 onto DC bias voltage 26 and inputs it to DC bias port 5 through SW 20.

By filter 51 comprised of a low-pass filter or a band-pass filter etc. the low-frequency component that is relevant to the said low frequency is extracted from the optical output component modulated by the said low frequency and is rectified by rectifier circuit 52.

The rectified voltage 53 is divided in normalizing circuit 56 by standard value 55 rectified through rectifying circuit 54 from low-frequency signal source 50, and becomes the low-frequency component value of normalized optical output. Normalized low-frequency component value 57(*m*) is inputted to the correction circuit of optical output standard value 58.

In the said correction circuit of optical output standard value 58, the variation from the standard value of initial operation is, by using the normalized value (mi) of the operation initial condition that is set preliminarily, outputted to the circuit of setting standard value of optical output 59, as m/mi.

In the said circuit of setting standard value of optical output 59, primary standard value Vrefi for the optical output of LD 12 (The said value is set in optical output primary standard value setting circuit 64.) is divided by m/mi and outputted as the new optical output standard value VrefL.

I.e. VrefL=Vrefi×(mi/m) and when m gets bigger than primary value mi; for example, when the optical output of LD 12 gets bigger than primary condition, VrefL is changed to get smaller than primary condition. Conversely, in case the optical output of LD 12 diminishes or the optical transmission factor of optical modulator is reduced, m gets smaller that primary value mi, and VrefL gets bigger than Vrefi.

In LD drive circuit 60, the monitor output 62 from the back beam monitor 61 incorporated into LD element 12 is received and compared to the above-described optical output standard value VrefL and LD drive current 48 is controlled in order that both sides may accord to each other.

If VrefL gets bigger, optical output is made increased by increasing LD drive current 48, and in reverse, if VrefL gets smaller, optical output is made decreased by decreasing LD drive current 48.

As described above, by amending standard value Vrefi corresponding to the optical output variation from optical modulator, it is possible to maintain the optical output from LN module constant.

In addition, there is a possibility that over-damping by closed loop occurs between drive circuit 60 and LD 12 and therefore, current limiter circuit 63 is installed in order to avoid overcurrent to LD 12.

Low-frequency signal amplitude Vf that is to be superimposed is a sufficiently small value in relation to Vpi, and is in the range where linier modulation can be maintained.

In this case, the low-frequency component (Pf) included in the optical output from optical modulator is expressed as the following formula;

$$Pf = A \times Pi \times T \times Vf/Vpi \times \sin(2\pi ft)$$

and the low-frequency component (Pf') after rectified is;

$$Pf' = B \times Pi \times T \times Vf$$

I.e. Pf' is proportional to amplitude Vf and at the same time, it is also proportional to optical input (Pi) and the optical transmission factor (T) of optical modulator (A, B are constant.). Therefore Pf'/Vf expresses the variation of Pi×T. The above m means m=Pf'/Vf.

In FIG. 7, due to the light source output variation of LD itself or the optical transmission factor variation of optical modulator, in case that the curve 43 is changed to the curve 44, the ratio of $P_O$ to $P_O'$ becomes same as that of the primary value (Pi×T)i of Pi×T to the value after shifted (Pi×T)'.

In operation point 43c, in case low-frequency signal (amplitude Vf) is superimposed, the rectified value of low-frequency component included in optical output becomes B×(Pi×T)i×Vf. In this regard, however, (Pi×T)i indicates the primary value of Pi×T.

On the other hand, the rectified value of low-frequency signal rectified directly is C×Vf (C is a constant) and if the said rectified value of low-frequency signal is normalized with this value, the said normalized value becomes $$mi = \{B \times (Pi \times T)i \times Vf\}/\{C \times Vf\} = B' \times (Pi \times T)i$$

(B' is a constant).

If m is calculated likewise as for operation point 44c, it is m=B'×(Pi×T)'.

From the above-mentioned, the ratio of $P_O$ to $P_O'$ becomes $P_O/P_O' = mi/m$.

Therefore, in order to regulate the optical output of LD and bring $P_O'$ back to $P_O$, it is necessary to multiple the optical output of LD by mi/m.

Hence, the new optical output standard value VrefL, which controls LD drive current, should be set as VrefL=Vrefi×mi/m.

Likewise, by amending optical output standard value VrefL in order that it may become VrefL=Vrefi×mi/m in accordance with the variation of mi/m, which indicates the gap (variation) from mi that is the primary value of m, it is made possible to maintain the optical output from LN optical modulator module 1 constant.

The above-mentioned frequency f of low-frequency signal is set sufficiently smaller than the cutoff frequency 1/(50×C), which is determined by the capacity C of input condenser 9 and the terminator 6(normally 50 Ω) that is the input impedance of optical modulator. Therefore it is the frequency that doe not affect the signal array of the optical output.

Figure 8:
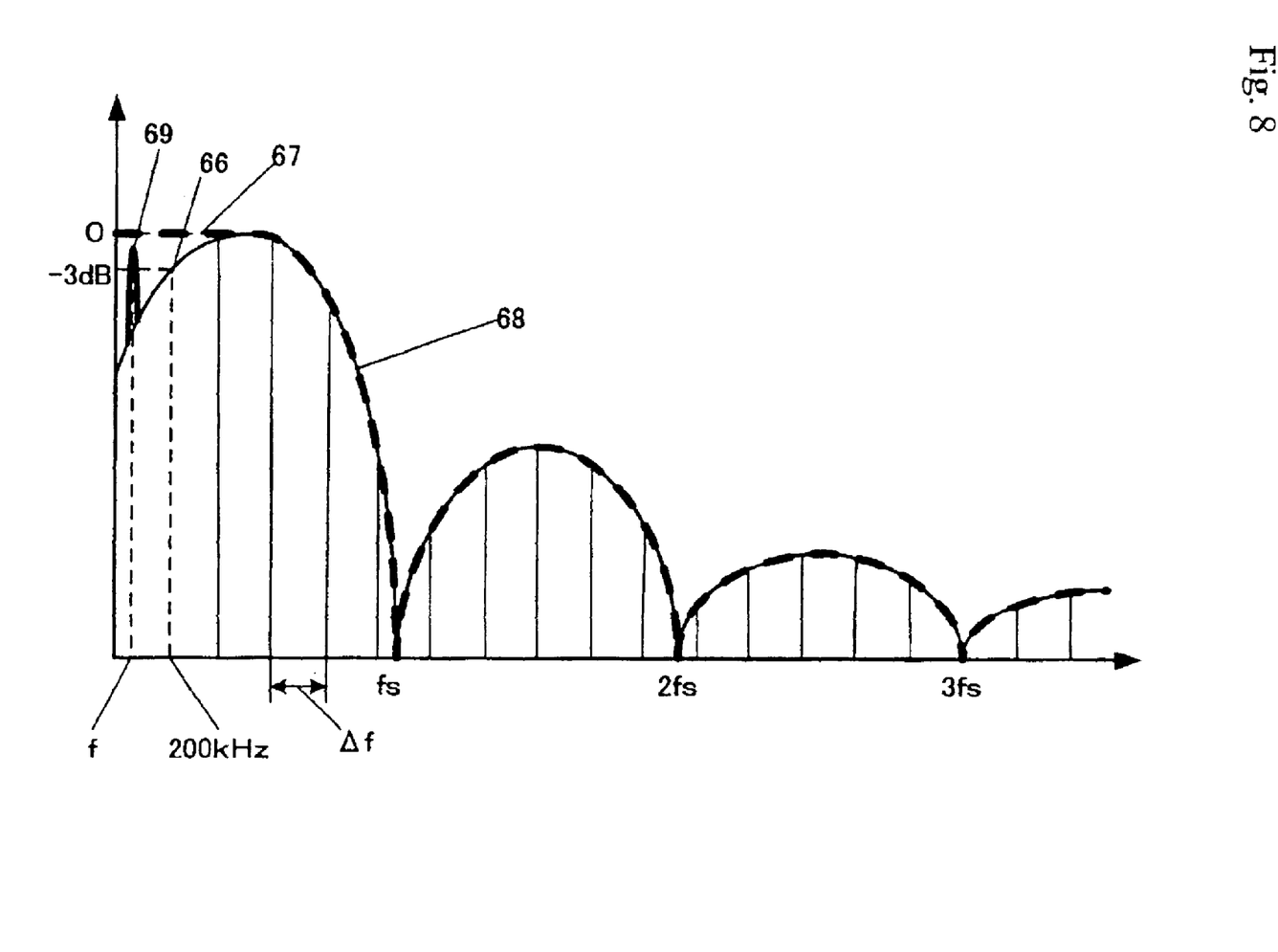
FIG. 8 shows the relationship of signal array spectrum and low-frequency signal.

FIG. 8, for instance, shows the example wherein C=0.1 μF, frequency of signal array is fs and the PRBS stage number is set as PN. In that condition, lower cutoff frequency 66 is around 200 kHz and the influence on signal array spectrum can be avoided by selecting as around f=1 kHz.

Here, Δf=fs/2PN−1 and dotted line 67 indicates the signal spectrum envelope curve of signal array generator 10, and solid line 68 the signal array spectrum in port 3.

The low-frequency superimposing signal 69 is the frequency of the low-frequency side, which is sufficiently far from the frequency 66 that is around the lower limit band of the line 68, and is thought to be unrelated to the signal array. Also, the influence of the above-mentioned signal array on the detection signal extracted through filter can be avoided and the pure low-frequency superimposing signal can be obtained.

Next, the control sequence of the method for stabilizing the operation point and optical output of the external optical modulator related to the present invention will be explained. The control sequence is done by the following procedure.

(1) to turn on the switch related to optical modulator, or to restart by resetting, (2) to set standard value Vrefi by optical output primary standard value setting circuit 64 in order that optical output from LD 21 may become the given value, (3) to make the contact point a and b of SW 20 conducted, output variable DC voltage from primary standard value setting means 19, measure the modulation curve of LN optical modulator by receiving the output from averaging circuit 21 and memorize operation point standard value Vrefw, corresponding to $P_O/2$, in memory 23, (4) to change over SW 29 in response to the slope polarity that is set by slope-setting means 27 (the operation point is set as the point $P_O/2$ at this moment), (5) to make the contact point a and c of SW 20 conducted and superimpose low-frequency signal onto DC bias voltage 26, (6) to memorize the normalized value (mi) of the low-frequency component included in optical output, in the correction circuit of optical output standard value 58, (7) to divide the new normalized value (m) by the memorized mi in the correction circuit of optical output standard value 58, (8) to close SW 70 and amend Vrefi in the circuit of setting standard value of optical output 59, (9) to control LD by the new standard value VrefL (the closed loop control of the optical output and operation point of LN optical modulator is started, from this step).

The procedure of (7) to (9) is repeated after this.

Herewith, by controlling the optical output from LN optical modulator module based on the magnitude of amplitude included in the optical output of superimposed low-frequency signal (especially the value normalized by the superimposed low-frequency signal), in the method of detecting the output-light of light source, such as the back beam monitoring method, even if the output-light variation by the defective tracking of LD light source or the transmission factor variation of LN optical modulator occurs, it is possible to control constantly the output-light from LN optical modulator module and moreover, stabilize the operation point of LN optical modulator in $P_O/2$.

Figure 11:
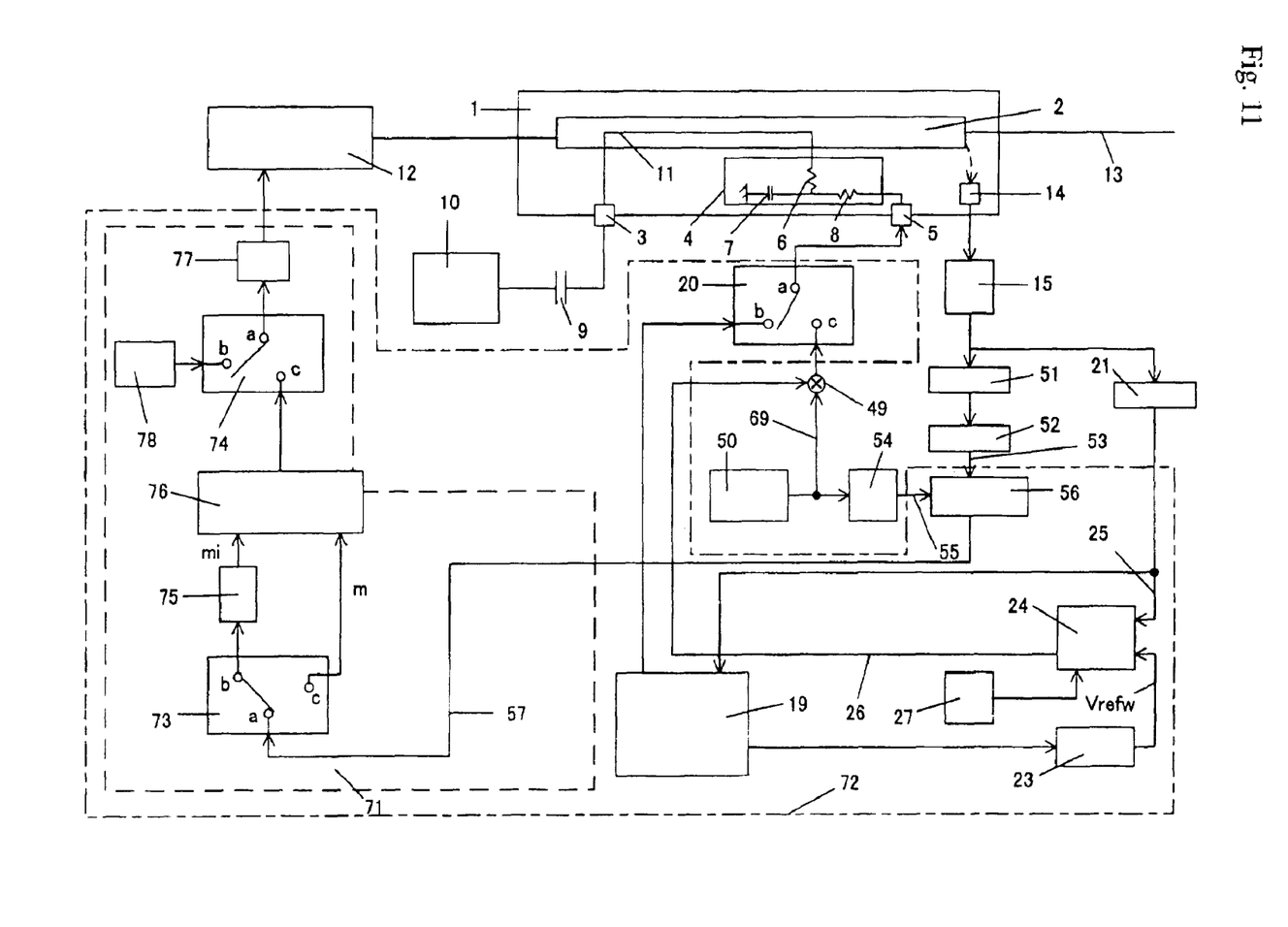

FIG. 11 shows the second embodiment concerning optical output controlling means 71 and it is the controlling method without the means for detecting the output-light of light source.

The switch (SW) 73, SW 74 and memory 75 are installed in the optical output controlling means 71, the primary value mi from normalizing circuit 56 is memorized in the memory 75 and after that, by changing over the SW 73, the following normalized value m and the value mi of the said memory 75 are compared by drive circuit 76 and the driving of LD 12 is controlled so that it may become m=mi.

The said embodiment does not use the output of back beam monitor PD of LD 12.

In addition, there is a possibility that over-damping by closed loop occurs between drive circuit 76 and LD 12 and therefore, current limiter circuit 77 is installed in order to avoid overcurrent to LD 12.

Following is the control sequence related to the second embodiment.

(1) to turn on the switch, or to restart from reset, (2) to make the contact point a and b of SW 74 conducted and set primary optical output by variable current source 78, so that the optical output from LD 12 may be the given value, (3) to make the contact point a and b of SW 20 conducted and output variable DC voltage from primary standard value setting means 19, measure the modulation curve of LN optical modulator by receiving the output from averaging circuit 21 and memorize operation point standard value Vrefw, corresponding to $P_O/2$, in memory 23, (4) to change over SW 29 in response to the slope polarity that is set by slope-setting means 27 (the operation point is set as the point $P_O/2$ at this moment), (5) to make the contact point a and c of SW 20 conducted and superimpose low-frequency signal onto DC bias voltage 26, (6) to make the contact point a and b of SW 73 conducted and memorize the primary normalized value mi of low-frequency component included in optical output, in memory 75, (7) to make the contact point a and c of SW 73 conducted and make it possible to compare the new normalized value m to the above-mentioned memorized primary normalized value mi by drive circuit 76, (8) to make the contact point a and c of SW 74 conducted and start controlling the optical output of LD 12 by the drive circuit 76 (the closed loop control of the optical output and operation point of LN optical modulator is started by this step).

Herewith, even in case the means of detecting the output-light of light source, such as back beam monitor, is not included, by adding the circuit that controls the normalized value mi, m of low-frequency component in order that it may become m=mi, even if the output-light variation of LD or the transmission factor variation of LN optical modulator occurs, it is possible to control constantly the output-light from LN optical modulator module and moreover, stabilize the operation point of LN optical modulator in $P_O/2$.

In addition, 65 and 72, which is the enclosed part by alternate long and short dash line in FIGS. 1 and 11, can be made into IC that incorporates microcomputer, such as DSP (or ASIC) and in this case, the above-mentioned control sequence operation can be realized easily.

Moreover, although $P_O/2$ is cited as the ideal operation point in the above explanation, it is not limited to this. If Vrefw is set at the value that does not correspond to $P_O/2$, the operation point can be set at the arbitrary point of the modulation curve slope. Even in this case, it is possible to apply the above-mentioned method and device for stabilizing the operation point and optical output.

In addition, it goes without saying that, as the application of the present invention, it is also possible to add the known technique to the above-mentioned composition of the present invention, if necessary, in order to improve further the stabilizing characteristic of the operation point and optical output of optical modulator, such as the improvement in the detection accuracy of the optical output from optical modulator or the stabilization of feedback control.

As explained hereinbefore, the present invention can provide the method and device for stabilizing the operation point and optical output of external optical modulator, which can control the wave pattern deformation of electrical signal array, and set up stably the operation point of the modulation curve of optical modulator and the optical output from optical modulator, even in case there is the optical output variation of light source itself or the transmission factor variation in optical modulator.

What is claimed is:

1. A method for stabilizing operation point and optical output of an external optical modulator including a light source, an external optical modulator modulating light from the light source, an optical detector detecting output-light from said external optical modulator, and means for regulating direct current bias applied to said external optical modulator, which regulates the direct current bias determining the operation point of a modulation curve of said external optical modulator, according to output of said optical detector, comprising the steps of:

superimposing onto said direct current bias a low-frequency signal, which is frequency below a lower limit of a signal frequency band of an input signal inputted to said external optical modulator;

extracting a low-frequency component included in the output of said optical detector;

normalizing on the basis of said low-frequency signal the output of said low-frequency component;

and controlling the output-light of said light source in accordance with said normalized low-frequency component, wherein:

a means of controlling optical output of light source is equipped, which, in control of the output-light of said light source, detects the output-light from said light source, compares a value of the detected output-light from said light source to a standard value of primary optical output determining primary optical output, and adjusts the output-light of said light source;

said standard value of primary optical output is modified according to a ratio of a primary value of said normalized low-frequency component to a subsequent value;

and said means of controlling optical output of light source is operated on the basis of said modified standard value.

2. A device for stabilizing operation point and optical output of an external optical modulator, which utilizes the method for stabilizing operation point and optical output of an external optical modulator, as claimed in claim 1.

3. The device for stabilizing operation point and optical output of an external optical modulator as claimed in claim 2, wherein said optical detector is a photodiode that is incorporated into a module comprising the external optical modulator.

4. The device for stabilizing operation point and optical output of an external optical modulator as claimed in claim 3, wherein said means of regulating direct current bias has an averaging circuit for obtaining a mean value of output of said external optical detector, and regulates the direct current bias applied to the external optical modulator in accordance with a value of said averaging circuit.

5. The device for stabilizing operation point and optical output of an external optical modulator as claimed in claim 3, wherein:

a low-pass filter or band-pass filter is used in order to extract the low-frequency component included in output of said optical detector.

6. The device for stabilizing operation point and optical output of an external optical modulator as claimed in claim 3, wherein:

said means of regulating direct current bias has slope-selecting means which, in fixing the operation point of the modulation curve of said external optical modulator, enables selection of slope of said modulation curve.

7. The device for stabilizing operation point and optical output of an external optical modulator as claimed in claim 3, wherein said light source is a laser diode.

8. The device for stabilizing operation point and optical output of an external optical modulator as claimed in claim 2, wherein said means of regulating direct current bias has an averaging circuit for obtaining a mean value of output of said external optical detector, and regulates the direct current bias applied to the external optical modulator in accordance with a value of said averaging circuit.

9. The device for stabilizing operation point and optical output of an external optical modulator as claimed in claim 8, wherein:

a low-pass filter or band-pass filter is used in order to extract the low-frequency component included in output of said optical detector.

10. The device for stabilizing operation point and optical output of an external optical modulator as claimed in claim 8, wherein said means of regulating direct current bias has slope-selecting means which, in fixing the operation point of the modulation curve of said external optical modulator, enables selection of slope of said modulation curve.

11. The device for stabilizing operation point and optical output of an external optical modulator as claimed in claim 8, wherein said light source is a laser diode.

12. The device for stabilizing operation point and optical output of an external optical modulator as claimed in claim 2, wherein:

a low-pass filter or band-pass filter is used in order to extract the low-frequency component included in output of said optical detector.

13. The device for stabilizing operation point and optical output of an external optical modulator as claimed in claim 12, wherein:

said means of regulating direct current bias has slope-selecting means which, in fixing the operation point of the modulation curve of said external optical modulator, enables selection of slope of said modulation curve.

14. The device for stabilizing operation point and optical output of an external optical modulator as claimed in claim 12, wherein said light source is a laser diode.

15. The device for stabilizing operation point and optical output of an external optical modulator as claimed in claim 2, wherein;

said means of regulating direct current bias has slope-selecting means which, in fixing the operation point of the modulation curve of said external optical modulator, enables selection of slope of said modulation curve.

16. The device for stabilizing operation point and optical output of an external optical modulator as claimed in claim 15, wherein said light source is a laser diode.

17. The device for stabilizing operation point and optical output of an external optical modulator as claimed in claim 2, wherein said light source is a laser diode.

18. The device for stabilizing operation point and optical output of an external optical modulator according to claim 2, wherein, in control of the output-light of said light source, the output-light of light source is controlled in order that a primary value of said normalized low-frequency component may accord with a subsequent value.

* * * * *